(12) United States Patent
Foye

(10) Patent No.: US 6,449,958 B1
(45) Date of Patent: Sep. 17, 2002

(54) CONTAINED BEVERAGE COOLING APPARATUS

(76) Inventor: Matthew R. Foye, 59 Cedar St., Plympton/Middleboro, MA (US) 02367

( * ) Notice: Subject to any disclaimer, the term of this patent is extended or adjusted under 35 U.S.C. 154(b) by 0 days.

(21) Appl. No.: 09/641,859

(22) Filed: Aug. 18, 2000

(51) Int. Cl.[7] .............................................. F25B 21/02
(52) U.S. Cl. ............................. 62/3.2; 62/3.3; 62/3.7; 62/457.9
(58) Field of Search ......................... 62/3.2, 3.3, 3.7, 62/457.9

(56) References Cited

U.S. PATENT DOCUMENTS

| | | |
|---|---|---|
| 3,402,561 A | 9/1968 | Mahoney |
| 3,808,825 A | 5/1974 | Ciurea |
| 4,320,626 A | 3/1982 | Donnelly |
| 4,384,512 A * | 5/1983 | Keith .......................... 99/308 |
| 4,782,670 A | 11/1988 | Long et al. |
| 4,823,554 A | 4/1989 | Trachtenberg et al. |
| 4,914,920 A | 4/1990 | Carnagie et al. |
| 5,060,479 A | 10/1991 | Carmi et al. |
| D322,887 S | 1/1992 | Kraker |
| 5,301,508 A | 4/1994 | Kahl et al. |
| 5,421,159 A | 6/1995 | Stokes |
| D388,050 S | 12/1997 | Diem |
| 5,718,124 A * | 2/1998 | Senecal ..................... 62/457.6 |
| 5,720,171 A | 2/1998 | Osterhoff et al. |
| 5,924,289 A | 7/1999 | Bishop, II |
| 6,082,114 A * | 7/2000 | Leonoff ....................... 62/3.64 |

* cited by examiner

*Primary Examiner*—William Doerrler
*Assistant Examiner*—Mark Shulman

(57) ABSTRACT

A contained beverage cooling apparatus for cooling and keeping cool a beverage placed in the apparatus. The contained beverage cooling apparatus includes a housing. The housing has a bottom wall and a top wall. A peripheral side wall extends between and is integrally coupled to a periphery of the top and bottom walls. The housing has a front side and a back side. The top wall has a hole therein for receiving a cylindrical can or cup. The hole is positioned generally adjacent to the front side of the housing. A cooling means for cooling a beverage placed in the hole includes a duct. The duct has an open first end and an open second end. The duct is positioned in a spaced relationship with the top wall such that the second end extends away from the back side of the housing. A first heat sink is securely attached to an interior of the top wall. A second heat sink is securely mounted to an interior surface of the duct. A thermo-electric device is positioned between the duct and the top wall. The thermo-electric device extends through the duct and the top wall such that the thermo-electric device is abutted against the first and second heat sinks. A fan means disperses air across the first and second heat sinks.

18 Claims, 5 Drawing Sheets

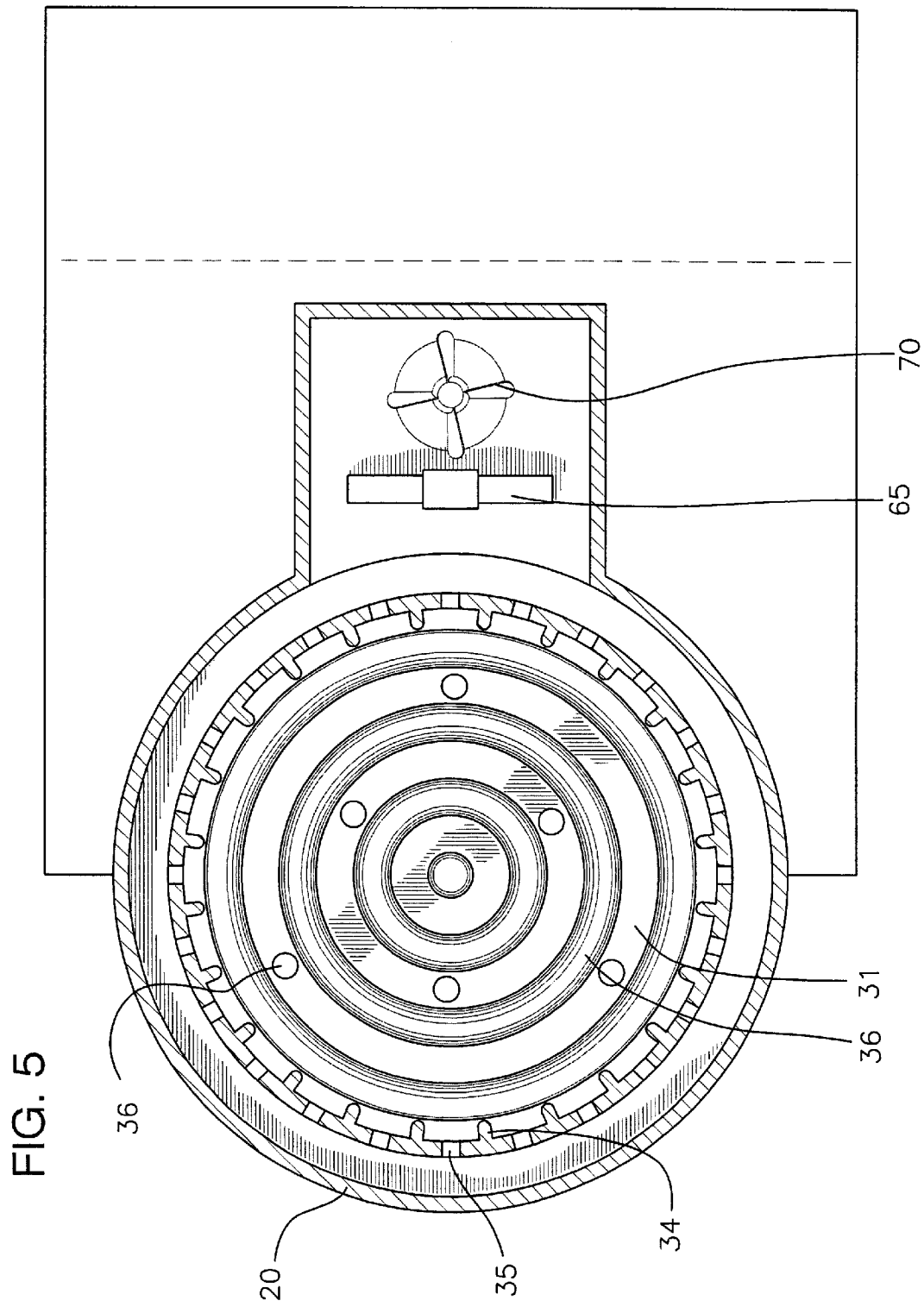

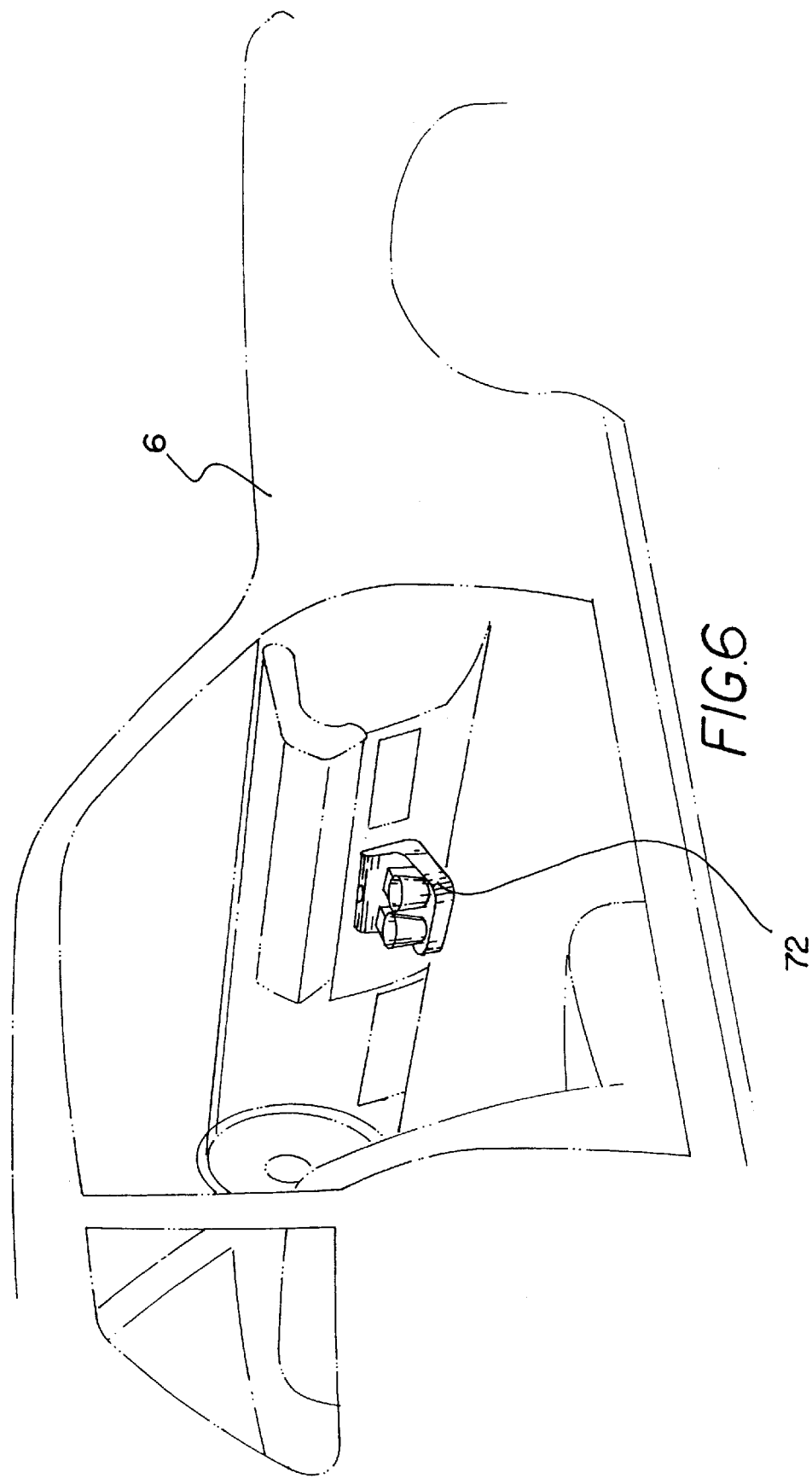

CONTAINED BEVERAGE COOLING APPARATUS

BACKGROUND OF THE INVENTION

1. Field of the Invention

The present invention relates to beverage cooling devices and more particularly pertains to a new contained beverage cooling apparatus for cooling and keeping cool a beverage placed in the apparatus.

2. Description of the Prior Art

The use of beverage cooling devices is known in the prior art. More specifically, beverage cooling devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,720,171; 5,421,159; 4,320,626; 4,823,554; 5,924,289; 4,782,670; 5,060,479; 5,301,508; 4,914,920; 3,808,825; 3,402,561; U.S. Pat. No. Des. 332,887; and U.S. Pat. No. Des. 338,050.

While these devices fulfill their respective, particular objectives and requirements, the aforementioned patents do not disclose a new contained beverage cooling apparatus. The inventive device includes a housing. The housing has a bottom wall and a top wall. A peripheral side wall extends between and is integrally coupled to a periphery of the top and bottom walls. The housing has a front side and a back side. The top wall has a hole therein for receiving a cylindrical can or cup. The hole is positioned generally adjacent to the front side of the housing. A cooling means for cooling a beverage placed in the hole includes a duct. The duct has an open first end and an open second end. The duct is positioned in a spaced relationship with the top wall such that the second end extends away from the back side of the housing. A first heat sink is securely attached to an interior of the top wall. A second heat sink is securely mounted to an interior surface of the duct. A thermo-electric device is positioned between the duct and the top wall. The thermo-electric device extends through the duct and the top wall such that the thermo-electric device is abutted against the first and second heat sinks. A fan means disperses air across the first and second heat sinks.

In these respects, the contained beverage cooling apparatus according to the present invention substantially departs from the conventional concepts and designs of the prior art, and in so doing provides an apparatus primarily developed for the purpose of cooling and keeping cool a beverage placed in the apparatus.

SUMMARY OF THE INVENTION

In view of the foregoing disadvantages inherent in the known types of beverage cooling devices now present in the prior art, the present invention provides a new contained beverage cooling apparatus construction wherein the same can be utilized for cooling and keeping cool a beverage placed in the apparatus.

The general purpose of the present invention, which will be described subsequently in greater detail, is to provide a new contained beverage cooling apparatus apparatus and method which has many of the advantages of the beverage cooling devices mentioned heretofore and many novel features that result in a new contained beverage cooling apparatus which is not anticipated, rendered obvious, suggested, or even implied by any of the prior art beverage cooling devices, either alone or in any combination thereof.

To attain this, the present invention generally comprises a housing. The housing has a bottom wall and a top wall. A peripheral side wall extends between and is integrally coupled to a periphery of the top and bottom walls. The housing has a front side and a back side. The top wall has a hole therein for receiving a cylindrical can or cup. The hole is positioned generally adjacent to the front side of the housing. A cooling means for cooling a beverage placed in the hole includes a duct. The duct has an open first end and an open second end. The duct is positioned in a spaced relationship with the top wall such that the second end extends away from the back side of the housing. A first heat sink is securely attached to an interior of the top wall. A second heat sink is securely mounted to an interior surface of the duct. A thermo-electric device is positioned between the duct and the top wall. The thermo-electric device extends through the duct and the top wall such that the thermo-electric device is abutted against the first and second heat sinks. A fan means disperses air across the first and second heat sinks.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new contained beverage cooling apparatus apparatus and method which has many of the advantages of the beverage cooling devices mentioned heretofore and many novel features that result in a new contained beverage cooling apparatus which is not anticipated, rendered obvious, suggested, or even implied by any of the prior art beverage cooling devices, either alone or in any combination thereof.

It is another object of the present invention to provide a new contained beverage cooling apparatus which may be easily and efficiently manufactured and marketed.

It is a further object of the present invention to provide a new contained beverage cooling apparatus which is of a durable and reliable construction.

An even further object of the present invention is to provide a new contained beverage cooling apparatus which is susceptible of a low cost of manufacture with regard to both materials and labor, and which accordingly is then susceptible of low prices of sale to the consuming public, thereby making such contained beverage cooling apparatus economically available to the buying public.

Still yet another object of the present invention is to provide a new contained beverage cooling apparatus which provides in the apparatuses and methods of the prior art some of the advantages thereof, while simultaneously overcoming some of the disadvantages normally associated therewith.

Still another object of the present invention is to provide a new contained beverage cooling apparatus for cooling and keeping cool a beverage placed in the apparatus.

Yet another object of the present invention is to provide a new contained beverage cooling apparatus which includes a housing. The housing has a bottom wall and a top wall. A peripheral side wall extends between and is integrally coupled to a periphery of the top and bottom walls. The housing has a front side and a back side. The top wall has a hole therein for receiving a cylindrical can or cup. The hole is positioned generally adjacent to the front side of the housing. A cooling means for cooling a beverage placed in the hole includes a duct. The duct has an open first end and an open second end. The duct is positioned in a spaced relationship with the top wall such that the second end extends away from the back side of the housing. A first heat sink is securely attached to an interior of the top wall. A second heat sink is securely mounted to an interior surface of the duct. A thermo-electric device is positioned between the duct and the top wall. The thermo-electric device extends through the duct and the top wall such that the thermo-electric device is abutted against the first and second heat sinks. A fan means disperses air across the first and second heat sinks.

Still yet another object of the present invention is to provide a new contained beverage cooling apparatus that is retrofittably mountable to the front console of a vehicle.

Even still another object of the present invention is to provide a new contained beverage cooling apparatus that has a container therein for controlling the flow of air current around a cup placed in the container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a schematic cross-sectional top view of the present invention.

FIG. 6 is a schematic in use view of the present invention.

DESCRIPTION OF THE PREFERRED EMBODIMENT

Figure 1:
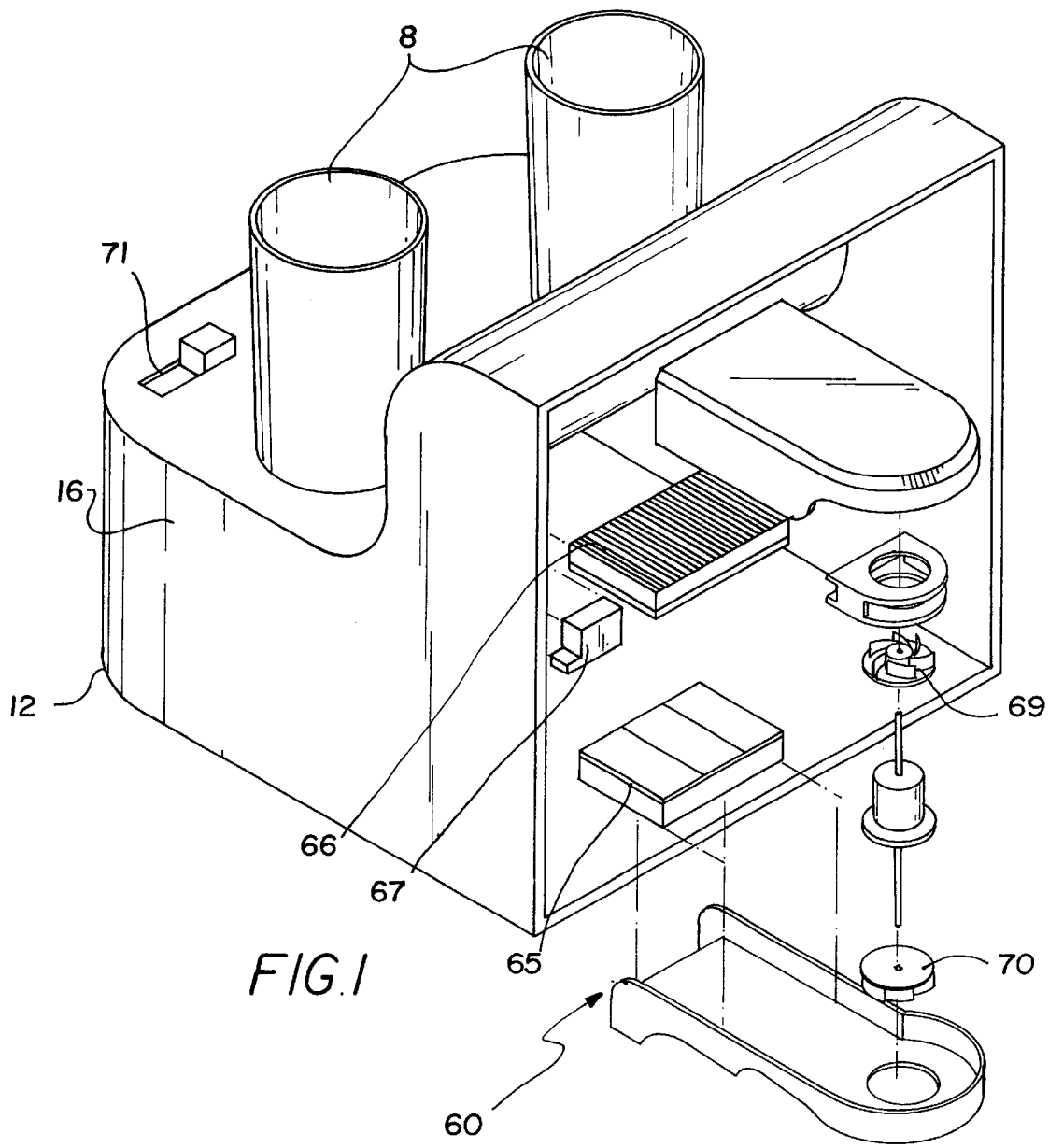
FIG. 1 is a schematic perspective view of a new contained beverage cooling apparatus according to the present invention.
Figure 2:
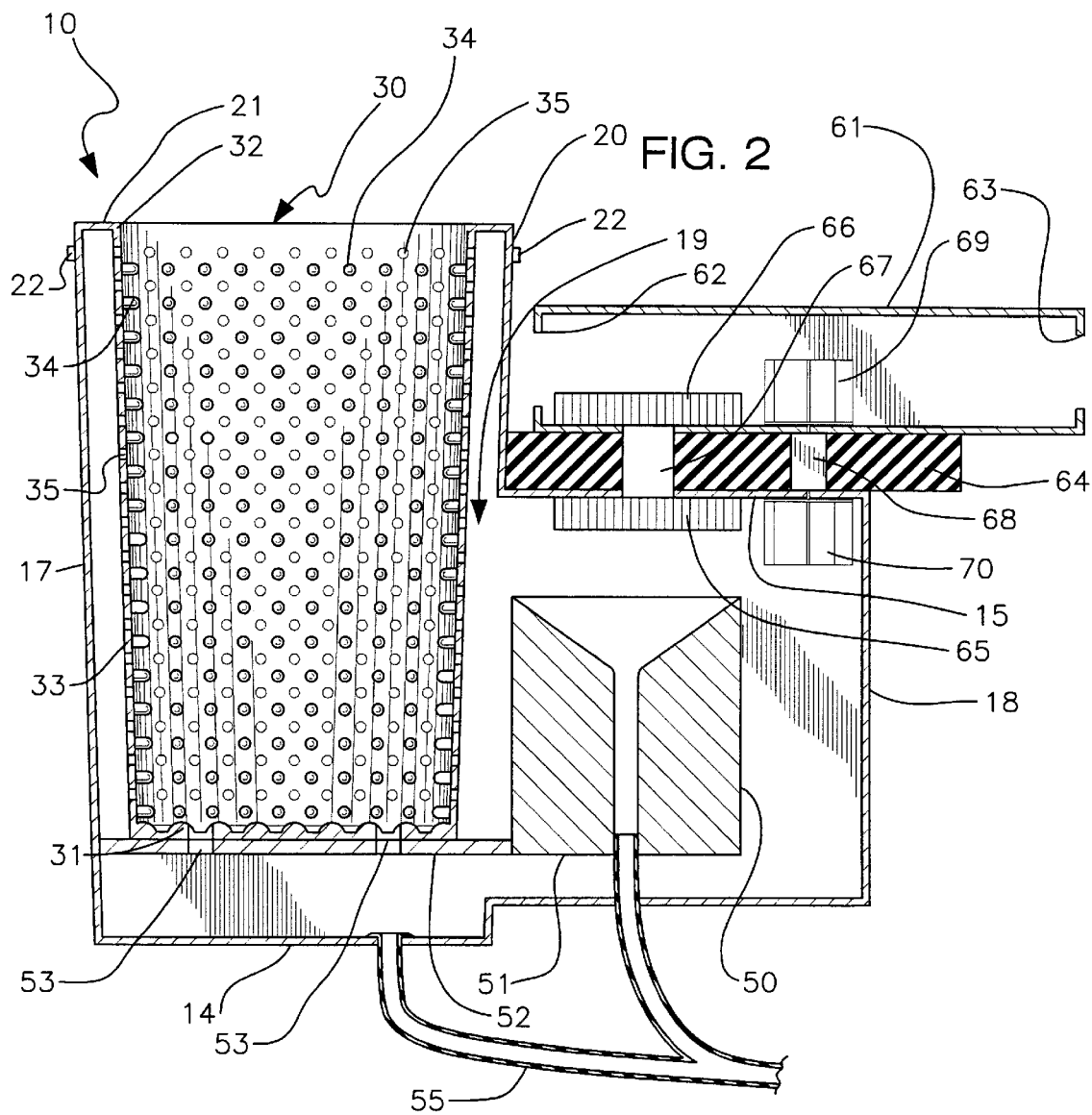
FIG. 2 is a schematic cross-sectional view of the preferred embodiment of the present invention.

With reference now to the drawings, and in particular to FIGS. 1 through 6 thereof, a new contained beverage cooling apparatus embodying the principles and concepts of the present invention and generally designated by the reference numeral 10 will be described.

As best illustrated in FIGS. 1 through 6, the contained beverage cooling apparatus 10 generally comprises a housing 12. The housing 12 has a bottom wall 14 and a top wall 15. A peripheral side wall 16 extends between and is integrally coupled to a periphery of the top 14 and bottom 15 walls. The housing 12 has a front side 17 and a back side 18. The top wall 14 has a hole 19 therein. The hole 19 is positioned generally adjacent to the front side 17 of the housing 12. In the preferred embodiment, shown in FIG. 2, an annular lip 20 is integrally coupled to and extends upwardly from an edge of the hole 19. The annular lip 20 has a top edge 21. A plurality of spaced nubs 22 is coupled to an outer surface of the annular lip 20 and each is positioned generally adjacent to the top edge 21. The second embodiment, shown in FIG. 1, depicts a housing 12 have two holes therein and each of a pair of cups 8 is placed in one of the holes.

A container 30 has a base wall 31. A perimeter side wall 33 is integrally coupled to a periphery of the base wall 31 and extends upwardly therefrom for defining an interior space and an upper peripheral edge 32. The upper peripheral edge 32 of the container 30 is integrally coupled to the top edge 21 of the annular lip 20 such that the container 30 extends downwardly through the annular lip 20 and into the housing 12. The perimeter side wall 33 has a plurality of apertures 35 therein. An interior of the perimeter side wall 33 has a plurality of protuberances 34 thereon. The protuberances 34 space a cup or cylindrical can away from the perimeter side wall 33 so that better airflow may occur. The base wall 31 has a top surface having a plurality of annular ridges 36 thereon, again for increasing airflow. The interior space of the container 30 is sized to releasably and fittedly receive the cylindrical can or cup-type container therein.

Figure 3:
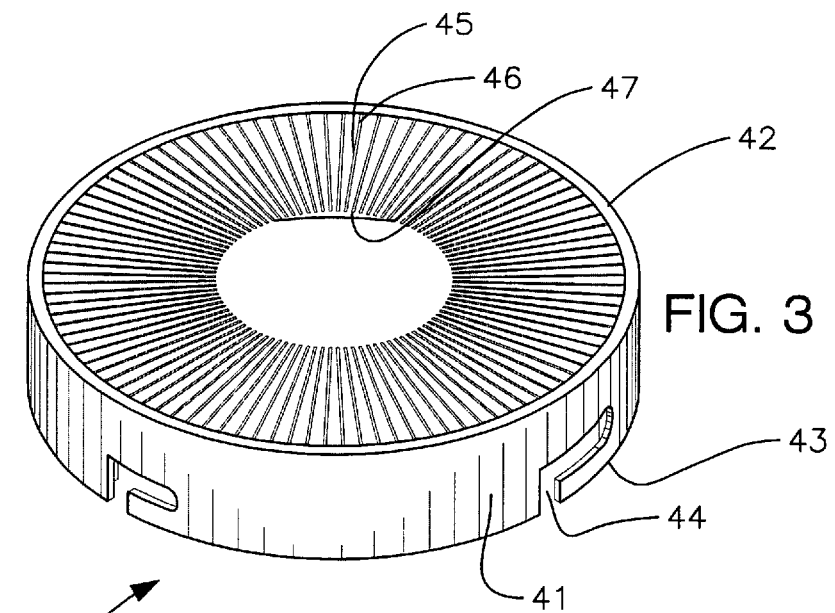
FIG. 3 is a schematic perspective view of a securing means for securing a cup in the container of the present invention.
Figure 4:
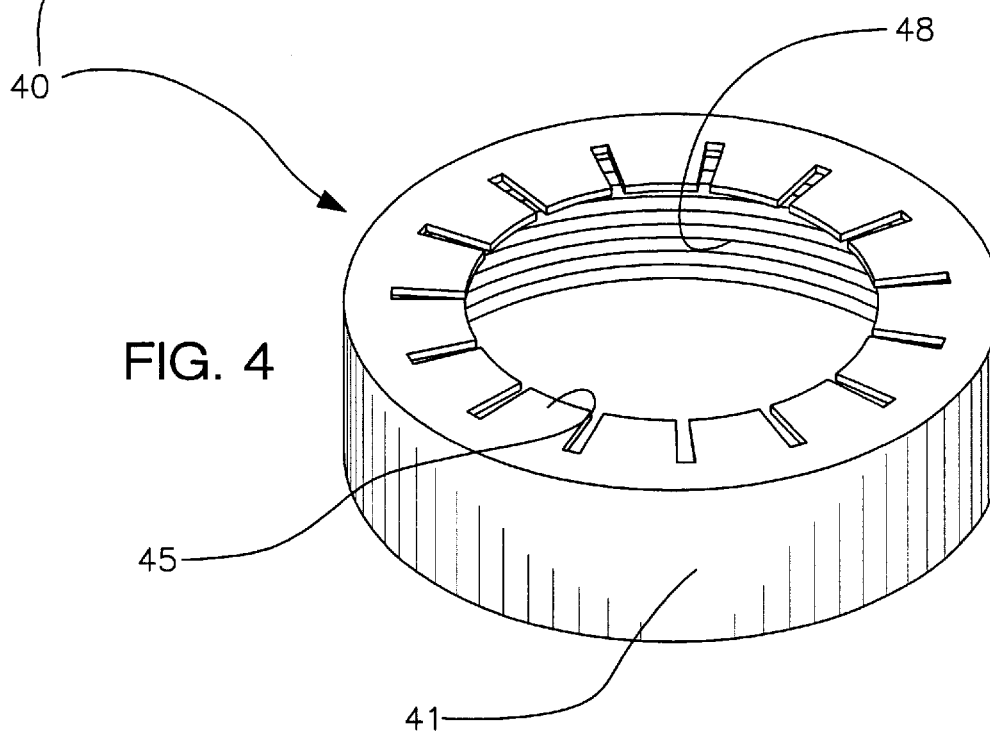
FIG. 4 is a schematic perspective view of an alternative securing means of the present invention.

A securing means 40 releasably secures the cylindrical can in the container. The securing means 40 comprises an annular wall 41 for positioning over and around the annular lip 20. The annular wall 41 has a top edge 42 and a bottom edge 43. The bottom edge 43 of the annular wall 41 has a plurality of slots 44 therein. Each of the slots 44 is positioned to releasably engage one of the nubs 22. Each of the slots 44 preferably has an L-shape for locking the annular wall 41 in an abutted position against the outer surface of the annular lip 20. Each of a plurality of elongate flexible members 45 has a first end 46 coupled to the top edge 42 of the annular wall 41. Each of the second ends 47 extends radially toward and an axis of the annular wall 41. Each of the elongate flexible members 45 preferably has length less than one-half a diameter of the annular wall 41. The elongate flexible members 45 may be bristles as shown in FIG. 3 or may be thicker protruding members as shown in FIG. 4. In another embodiment, the annular wall 41 has a threaded interior 48 adapted to engage threads which would be positioned on the outer surface of the annular lip. The securing means 40 is removable to offer easy cleaning of the inside of the container 30.

A block member 50 is positioned in the housing generally between the container 30 and the back side 18 of the housing 12. The block member 50 has a bottom side 51 having a plate 52 extending therefrom. The plate 52 is securely attached to a bottom surface of the base wall 31. The plate 52 extends across and is integrally coupled to the front side 17 so that the container is separated from the bottom wall 14. A plurality of holes 53 extends through the base wall and through the plate. The holes 53 through the base wall and plate 52 are preferably larger than the apertures 35. The block member 50 is spaced from the bottom 14 and top 15 walls of the housing 12. The block 50 and the plate 52 extend between a pair of opposite sides of the housing 12. This configuration allows circulation of air from a position between the block member 50 and the top wall 15, around the container 30, through the apertures 35, downward through the holes 53, between the plate 52 and the bottom wall 14 and back upwards to a position between the back wall 18 and the block member 50.

A cooling means 60 for cooling a beverage held in the container 30 includes a duct 61. The duct 61 has an open first end 62 and an open second end 63. The duct 61 is positioned in a spaced relationship with the top wall 15 such that the second end 63 extends away from the back side 18 of the housing 12. It should be understood that the second end 63 of the duct 61 may be extended to any place seen suitable for depositing of warm air. An insulation means 64 preferably insulates the duct 61 from the housing 12. The insulation means 64 is positioned between the duct 61 and the housing 12. A first heat sink 65 is securely attached to an interior of the top wall 15 and is positioned between the top wall 15 and the block member 50. A second heat sink 66 is securely mounted to an interior surface of the duct 61. A thermoelectric device 67 is positioned between the duct 61 and the top wall 15. The thermo-electric device extends through the insulation means 64, the duct 61 and the top wall 15 such that the thermoelectric device 67 is abutted against the first 65 and second 66 heat sinks. The insulation prevents thermal energy from leaking between the two heat sinks.

The thermo-electric device 67 uses flow of current to facilitate heat transfer. To accomplish this, semiconductors may be used to exploit the "peltier effect". In such embodiment, a reversal of current flow through a specially configured N-type and P-type semiconductor, or a dissimilar wire harness, is employed. One of the semiconductors draws heat while the other expels heat. By positioning the semiconductor drawing heat against the first heat sink 65, heat is pulled from the housing and transferred to the second heat sink 66 so that the first heat sink becomes relatively cold. The current may be reversed in which case the device would heat the contents of the housing instead of cooling them, and it should be noted that a switch may be added for switching polarity of the thermo-electric device to heat the contents of the housing 12.

A fan means 68 disperses air across the first 65 and second 66 heat sinks. A first portion 69 of the fan means is mounted in the duct 61 and positioned between the second heat sink 66 and the second end 63 of the duct 61. The first portion 69 is adapted to draw air into the opening in the first end 62 and across the second heat sink 66. A second portion 70 of the fan means 68 is mounted in the housing 12 and positioned between the back side 18 of the housing 12 and the first heat sink 65. The second portion 70 of the fan mans 68 is adapted to force air across the first heat sink 65 and circulate the air through the container 30 in a manner as discussed above.

An actuating means 71 selectively turns the fan means 68 and the thermo-electric device 67 on and off. The actuating means 71 is preferably mounted on the top wall 15. The actuating means 71 is operationally coupled to the fan means 68 and the thermo-electric device 67.

A power supply powers the fan means and the thermoelectric device. The power supply is operationally coupled to the actuating means. The power supply is preferably hard wired into the electrical system of the motor vehicle 6.

Ideally, a second beverage cooling apparatus is added to define a pair of beverage cooling apparatuses. The pair is securely attached together to define a unit 72. The unit 72 is securely and operationally coupled to a front console of the motor vehicle 6. The unit 72, or individual devices, may also me placed in other positions in the vehicle 6, such as on the back wall of a front seat for access to persons riding in the back of the vehicle.

Also envisioned is a tube 55 fluidly connected to a bottom of the housing to carry away any condensation, which may occur in the housing due to the cold temperature of the first heat sink. This tube may also be fluidly coupled to a top side 56 of the block member 50 which may be angled downward for catching condensation from the first heat sink 65.

Preferably, the device 10 would be extendable into the front console area of the vehicle for hiding the device 10 when not in use. Also, instead of sliding the device into the console, the device could be flipped upwards and into the console. Both versions of hiding the holders are conventionally found on vehicles with beverage holders.

In use, a person places their cup in the housing, either in the container or, in the simpler version shown in FIG. 1, through the hole in the housing. The actuating means is turned to the on position. The fan means in the duct pulls air from the interior of the vehicle and across the second heat sink to cool it down. Warm is from the duct is expelled out the second end of the duct and away from the occupants of the vehicle. The fan means in the housing circulates air across the first heat sink, which is cold, and around the cup or can in situated in the housing to cool it.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A beverage cooling device comprising, in combination:
a container comprising:
- a container base for resting on a surface; and
- a peripheral side wall extending upwardly from a periphery of said container base such that said container base and said peripheral side wall define an interior space of the container for receiving liquids:
wherein said container base comprises:
- a base wall;
- a side wall extending upwardly from said base wall;
- a first intermediate wall located above said base wall, said first intermediate wall being mounted to said side wall, said base wall and said first intermediate wall defining a first compartment therebetween, said first compartment having an interior;
- a perimeter wall extending downwardly from said base wall, said perimeter wall having a lower peripheral edge;
- a second intermediate wall located below said base wall, said second intermediate wall being mounted to said perimeter wall, said base wall and said second intermediate wall defining a second compartment therebetween, said second compartment having an interior, said second intermediate wall having a plurality of holes therethrough;
- wherein said perimeter wall has a plurality of openings extending therethrough, said openings being positioned between said base wall and said second intermediate face and being in fluid communication with the interior of said second compartment for permitting air flow out of the interior of said second compartment; and
heat transfer means for transferring heat into or out of liquid held in said interior space of said container, said cooling means being located in said container base, said heat transfer means comprising:
- a first heat sink mounted on said base wall and being positioned in said first compartment, said first heat sink extending toward said first intermediate wall;
- a second heat sink mounted on said base wall and being positioned in said second compartment, said second heat sink extending toward said second intermediate wall; and
- a thermo-electric device for selectively moving heat between said first and second heat sinks, said thermo-electric device being positioned on said base wall, said thermo-electric device being positioned between and abutting against said first and second heat sinks such that said thermo-electric device selectively transfers heat to one of said first and second sinks and transfers heat from the other of said first and second sinks.

2. The device of claim 1, additionally comprising a fan for moving air toward and across said second heat sink, said fan being mounted on said second intermediate wall in said second compartment for pulling air through the plurality of holes in said second intermediate wall and into said second compartment for moving across said second heat sink.

3. The device of claim 1 wherein said first intermediate wall is oriented in a substantially parallel orientation with respect to said base wall.

4. The device of claim 1 wherein said second intermediate wall is oriented in a substantially parallel orientation with respect to said base wall.

5. The device of claim 1 wherein said second intermediate wall is spaced from the lower peripheral edge of said perimeter wall.

6. The device of claim 1 wherein said lower peripheral edge of said perimeter wall has a plurality of apertures therein for permitting air flow through said perimeter wall and through the plurality of holes of said second intermediate wall and into the interior of said second compartment.

7. The device of claim 1 wherein said peripheral side wall comprises:
- an interior wall forming an interior surface of said container for contacting liquid placed in the interior space of said container, said interior wall being integrally mounted on said first intermediate wall such that said first intermediate wall forms a lower surface of said interior space of said container;
- an exterior wall extending about and in a spaced relationship with said interior wall; and
- an insulating material positioned between said interior and exterior walls for resisting heat transfer between said interior and exterior walls.

8. The device of claim 7 wherein said interior wall comprises a heat conductive material, and said exterior wall comprises a heat transfer resisting material.

9. An apparatus for holding a container and effecting heat transfer to and from the container and any contents of the container, said apparatus comprising:
- a housing having an interior
- a container receiving member mounted on said housing, said container receiving member having a base wall and a perimeter side wall being coupled to a periphery of said base wall and extending upwardly therefrom for defining an interior space, said perimeter side wall having a plurality of apertures therein, said perimeter side wall having an inner surface;
- spacing means for spacing said perimeter side wall from a container when the container is inserted in said container receiving member to create an air flow space therebetween;
- a convection heat transfer means for causing convection heat transfer with respect to a container when the container is recieved in said container receiving member, said convection heat transfer means comprising:
  - a duct having an open first end and an open second end;
  - a first heat sink positioned in the interior of said housing, said first heat sink being attached to an interior of said top wall of said housing;
  - a second heat sink positioned in said duct, said second heat sink being mounted on an interior surface of said duct;
  - a thermo-electric device being positioned between and abutted against said first and second heat sinks, said thermo-electric device being positioned between said duct and said top wall of said housing, said thermo-electric device extending through said insulation means, said duct and said top wall such that said thermo-electric device is abutted against said first and second heat sinks; and
  - a fan means for moving air across said first and second heat sinks, a first portion of said fan means being, mounted in said duct for creating an air flow through said duct between said first and second open ends to move air across said second heat sink, a second portion of said fan means being mounted in an interior of said housing for forcing air across said first heat sink and through said plurality of apertures in said container when the container is positioned in said container receiving member.

10. The apparatus of claim 9 wherein said spacing means comprises a plurality of protuberances formed on an inner surface of said perimeter side wall of said container receiving member.

11. The apparatus of claim 9 wherein, said spacing means comprising a plurality of annular ridges formed on a top surface of said base wall.

12. The apparatus of claim 9 wherein said spacing means comprises a plurality of protuberances formed on an inner surface of said perimeter side wall of said container receiving member and a plurality of annular ridges formed on a top surface of said base wall.

13. The apparatus of claim 9 wherein said housing comprises:
   a bottom wall, a top wall, and a peripheral side wall extending between and being integrally coupled to a periphery of said top and bottom walls, a front side and a back side;
   a hole formed on the top wall of said housing.

14. The apparatus of claim 13 wherein said housing comprises:
   an annular lip being integrally coupled to and extending upwardly from said top wall about said hole, said annular lip having a top edge; and
   a plurality of spaced nubs being formed an outer surface of said annular lip being positioned generally adjacent to said top edge.

15. The apparatus of claim 14 additionally comprising a securing means for releasably securing the container when the container is inserted in said container receiving member, said securing means comprising an annular wall for positioning over said annular lip, said annular wall having a top edge and a bottom edge, said bottom edge of said annular wall having a plurality of slots therein, each of said slots being positioned to releasably engage one of said nubs, each of said slots having an L-shape, a plurality of elongate flexible members having a first end being coupled to said top edge of said annular wall, each of said second ends extending radially inward toward an axis of said annular wall, each of said elongate flexible members generally having length less than one-half a diameter of said annular wall.

16. The apparatus of claim 9 additionally comprising a second container receiving member mounted on said housing, said container receiving member having a base wall and a perimeter side wall being coupled to a periphery of said base wall and extnding upwardly therefrom for defining an interior space, said perimeter side wall having a plurality of apertures therein, said perimeter side wall having an inner surface; and second spacing means for spacing said perimeter side wall of said second container receiving member from a container when the container is inserted in said second container receiving member to create an air flow space therebetween.

17. An apparatus for holding a container and effecting heat transfer to and from the container and any contents of the container, said apparatus comprising:
   a housing, said housing comprising:
      a btootm wall, a top wall, and a peripheral side wall extending between and being integrally coupled to a periphery of said top and bottom walls, a front side and a back side;
      a hole formed on the top wall of said housing;
      an annular lip being integrally coupled to and extending upwardly from said top wall about said hole, said annular lip having a top edge;
      a plurality of spaced nubs being formed an outer surface of said annular lip being positioned generally adjacent to said top edge;
   a container receiving member mounted on said housing, said container receiving member having a base wall and a perimeter side wall being coupled to a periphery of said base wall and extending upwardly therefrom for defining an interior space, said perimeter side wall having a plurality of apertures therein, said perimeter side wall having an inner surface;
   spacing means for spacing said perimeter side wall from a container when the container is inserted in said container receiving member to create an air flow space therebetween, said spacing means comprising a plurality of protuberances formed on an inner surface of said perimeter side wall of said container receiving member, said spacing means comprising a plurality of annular ridges formed on a top surface of said base wall;
   a securing means for releasably securing the container when the container is inserted in said container receiving member, said securing means comprising an annular wall for positioning over said annular lip, said annular wall having a top edge and a bottom edge, said bottom edge of said annular wall having a plurality of slots therein, each of said slots being positioned to releasably engage one of said nubs, each of said slots having an L-shape, a plurality of elongate flexible members having a first end being coupled to said top edge of said annular wall, each of said second ends extending radially inward toward an axis of said annular wall, each of said elongate flexible members generally having length less than one-half a diameter of said annular wall;
   a convection heat transfer means for causing convection heat transfer with respect to a container when a container is received in said container receiving member, said convection heat transfer means comprising:
      a duct having an open first end and an open second end;
      insulation for insulating said duct from an interior of said housing, said insulation being positioned between said duct and said housing;
      a first heat sink positioned in said housing, said first heat sink being attached to an interior of said top wall of said housing;
      a second heat sink positioned in said duct, said second heat sink being mounted on an interior surface of said duct;
      a thermo-electric device being positioned between and abutted against said first and second heat sinks, said thermo-electric device being positioned between said duct and said top wall of said housing, said thermo-electric device extending through said insulation means, said duct and said top wall such that said thermo-electric device is abutted against said first and second heat sinks;
      a fan means for moving air across said first and second heat sinks, a first portion of said fan means being mounted in said duct for creating an air flow through said duct between said first and second open ends to move air across said second heat sink, a second portion of said fan means being mounted in an interior of said housing for forcing air across said first heat sink and through said plurality of apertures in said container receiving member for contacting a container when the container is positioned in said container receiving member;
   a power supply for powering said fan means and said thermo-electric device, said power supply being operationally coupled to said actuating means;
   an actuating means for selectively supplying power from said power supply to said fan means and said thermo-electric device, said actuating means being operationally coupled to said fan means and said thermo-electric device.

18. The apparatus of claim 17 additionally comprising a second container receiving member mounted on said housing, said container receiving member having a base wall and a perimeter side wall being coupled to a periphery of said base wall and extending upwardly therefrom for defining an interior space, said perimeter side wall having a plurality of apertures therein, said perimeter side wall having an inner surface; and second spacing means for spacing said perimeter side wall of said second container receiving member from a container when the container is inserted in said second container receiving member to create an air flow space therebetween.

* * * * *